Feb. 5, 1957 — H. STAVERT — 2,780,057
LOCKS FOR JET THRUST REVERSERS
Filed Feb. 23, 1954 — 2 Sheets-Sheet 1

INVENTOR.
HARRY STAVERT
BY
Reynolds, Beach & Christensen
ATTORNEYS

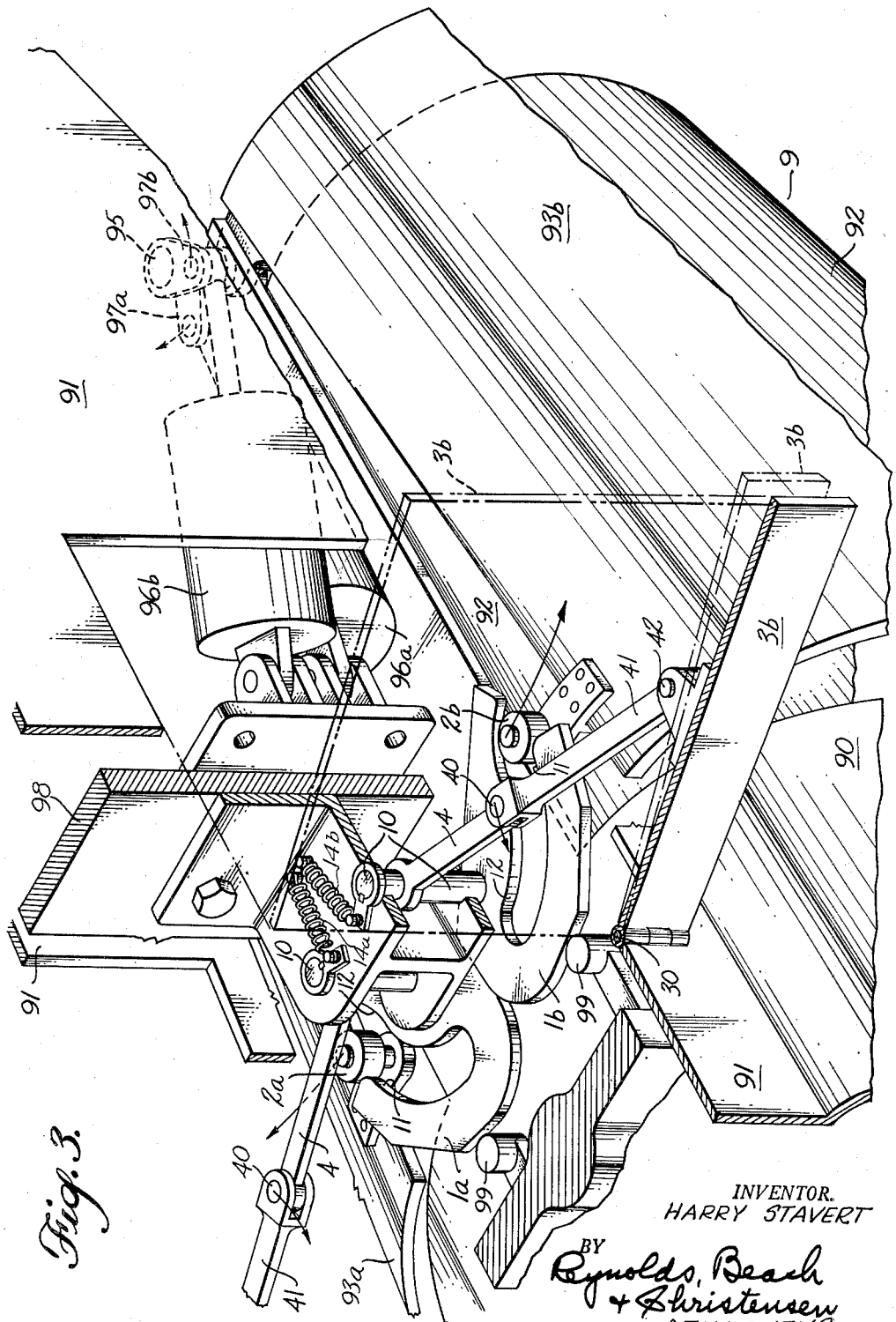

United States Patent Office 2,780,057
Patented Feb. 5, 1957

2,780,057

LOCKS FOR JET THRUST REVERSERS

Harry Stavert, Seattle, Wash., assignor to Boeing Airplane Company, Seattle, Wash., a corporation of Delaware Application February 23, 1954, Serial No. 411,872

8 Claims. (Cl. 60—35.54)

Whereas propeller driven airplanes can be slowed down upon landing by reversing the pitch of the propeller blades, thereby producing a rearwardly directed thrust, a jet-propelled airplane has no propellers, and the production of a reverse thrust is not readily accomplished. It can be done by employing flap devices which in normal flight are retracted within or which constitute a continuation of the streamline contour of the propulsive assembly constituted by the jet engine and its supporting structure, located in the vicinity of the jet nozzle or tailpipe, and which can be shifted to intercept the jet issuing from the tailpipe and to direct that jet more or less forwardly, or at least laterally, rather than rearwardly. An example of such a jet thrust reverser is shown in the patent to Lundberg, No. 2,620,622, dated December 9, 1952; a further example, and one to which the present invention more directly relates, is found in the copending application of George T. Drakeley, Serial No. 394,728, filed November 27, 1953.

Broadly speaking, the type and location of the thrust reverser device is not material to the present invention, and the thrust reverser device may be of any suitable type, formed of relatively immovable parts or of relatively movable parts, and mounted about or within the tailpipe, or upon the engine housing or the engine supporting structure, so long as it is movable bodily between a retracted position and its operative position, at the rear of the tailpipe, and so long as it is, in its retracted position, open to the possibility of being forced from that position by relative movement of air or jet gases past it, and so of being moved accidentally to its operative position. This invention concerns a locking means to insure against such accidental movement, by virtue of the movement of the relative airstream past a swingable vane associated with the locking means, the airstream in this case serving to hold the vane and locking means in or to prevent its movement from lock-secured position just as strongly or more strongly than the airstream or jet stream forces act upon the thrust reverser device to open the latter. Thus the locking means must be positively moved by an actuator, against reduced airstream forces corresponding to lower airspeed during the landing run, in order to release the thrust reverser device for its movement into operative position.

Nevertheless, this invention has been devised primarily for use with thrust reverser devices of the Drakeley type, which incorporate hollow semi-cylindrical flap devices hingedly mounted adjacent their rear ends so that their forward ends may swing outwardly beyond the engine housing into the relative airstream while their rear ends swing inwardly and rearwardly behind the tailpipe. They are designed to withstand the forces acting upon them, including the relative airstream, during the landing run, but if their forward end projects by even a slight amount into the airstream at the much higher speeds of normal flight, it is probable that the flap devices will be opened, or torn off, or damaged. The results, in any such event, are likely to be disastrous.

It is possible, of course, to employ a simple latching device to secure the flaps in closed position, but a latching device that would be strong enough in itself to insure the retention of the flap devices and to resist such forces as might tend to tear them open would necessarily be heavy and would require heavy reinforcement of the supporting aircraft structure. Also, it would probably require an actuator separate from any actuator for the flap devices, but necessarily coordinated with the latter, thereby adding further weight and introducing mechanical and hydraulic complications.

Accordingly, the primary objects of this invention are to provide a locking means for such a thrust reverser device in general, and such thrust reverser flaps in particular, which is of simple, light construction; in which the two locks—one at the right side and the other at the left side—mutually and quite directly assist one another in resisting any flap-opening force of the airstream, and so relieve the aircraft structure of such loads; in which the relative airstream is made use of to assist in retaining parts in locked position, and conversely, in unlocked position; and which requires no actuator for the locks apart from that which actuates the flaps, being so coordinated mechanically with the flaps and their actuators as to be movable into unlocked position, and conversely into locked position, by the power actuator used to swing the flap devices into outswung operative position and into retracted position, respectively.

It is a further and more specific object to provide such a locking means in which a hook member mounted on the aircraft structure engages a retainer on the swinging forward end of a flap device and is moved into its releasing position through such engagement by the power controlled flap-opening movement, and is held in the unlocked position ready for reengagement by a member subject to the force of the relative airstream, but in which the member last-mentioned is arranged so that, in the locked position, the force of the relative airstream supplements the inherent force of the hook member to insure retention of the flap device in the fully closed or retracted position.

In the accompanying drawings the invention is shown in a typical form, and associated with a typical thrust reverser means, although not all the details of the thrust reverser have been illustrated in their preferable form in the accompanying drawings, since this invention is adapted for use in conjunction with thrust reverser flaps whether or not the same are of the type shown in the Drakeley application referred to above.

Figure 3 is an enlarged isometric view, looking generally rearward, and illustrating the locking means and its relationship to the thrust reverser flaps and to its own vane just preceding release.

Figure 1:
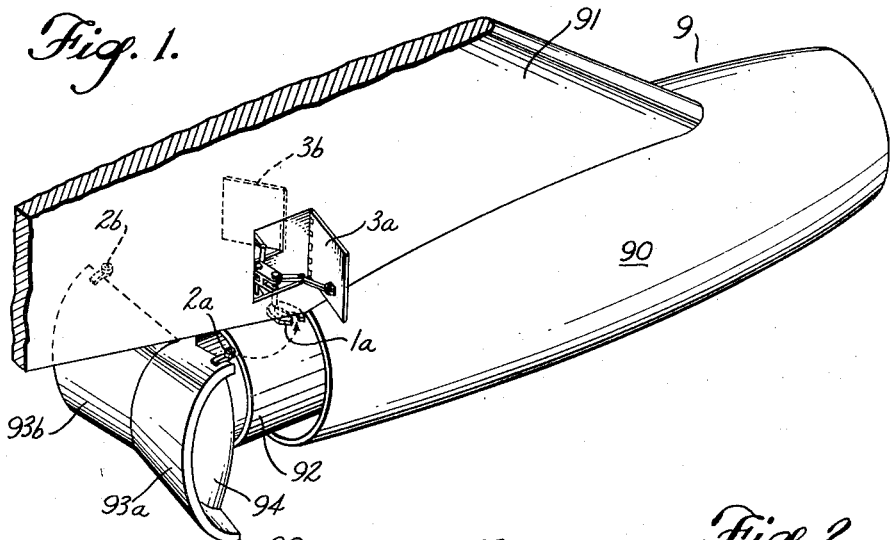
Figure 1 is a quartering rear isometric view of a jet engine pod, shown with the thrust reverser flaps in their outswung, operative position, and with the locking hook held securely in unlocked position, ready for reengagement.

In describing the structure it will be understood that the mechanisms are duplicated at right and at left, respectively. Where it becomes necessary to distinguish like parts, in the drawings or in this specification, the part on the right will be designated by the letter suffix *a*, and the part on the left by the suffix *b*. Where no distinction is required it will be simpler to refer herein to the parts without any suffix, notwithstanding that the drawing may show only parts marked with suffixes.

By way of illustration, a jet engine, indicated as a whole by the numeral 9, is shown as housed within a generally streamlined housing 90, upon the lower end of a pendent supporting strut 91. The engine tailpipe is illustrated at 92, at the tail end of and within the housing 90, and thrust reverser flaps 93 are shown adjacent the rear of the housing 90, pivoted on a common vertical axis 95 adjacent their rear end for swinging their forward ends outwardly and rearwardly to open or operative position, and inwardly and forwardly into retracted position. When retracted they lie substantially in smooth, streamline continuation of the rear portion of the housing 90. Baffles 94 are shown in Figure 1 in operative position, in accordance with the Drakeley invention, but the operating means for the same have been omitted in order to simplify the disclosure and to avoid confusion with the operative parts of the present invention.

The respective flap devices 93a and 93b are swingable from their retracted position into their outwardly projected operative position, shown in Figure 1, under control of power means which are typified by the jack devices 96a and 96b connected to the respective levers 97a and 97b, secured at the axis 95 to the respective pivot pins of the two flaps. The power means react from suitable fixed aircraft structure, such as the bulkhead 98 within the strut 91. The arrangements illustrated are representative only, since their precise form is immaterial insofar as it concerns the present invention, and reference may be had to the Drakeley application for further details.

The present invention concerns the locking means for use in conjunction with flap devices of the general nature indicated above. Speaking generally, such locking devices comprise hook members 1a and 1b and retainers in the nature of pins and rollers 2a and 2b, mounted upon the forward or swinging portions of the respective flaps 93a and 93b. Since the two locking devices are identical at the opposite sides a description of one will suffice.

Such a hook member 1 is pivotally mounted upon an upright axis indicated at 10, supported from the bulkhead 98 or other similar fixed structure, preferably within the strut 91. It is therefore located above the flap which it is to control. This hook member 1 is provided with a cam slot of a size to receive and confine closely the follower or retainer 2. In effect this cam slot inclines from its bottom portion, which is located closely adjacent the pivot 10, to an outer or exit portion which is appreciably farther from the pivot axis. The details of the cam slot will be explained hereinafter.

Figure 2:
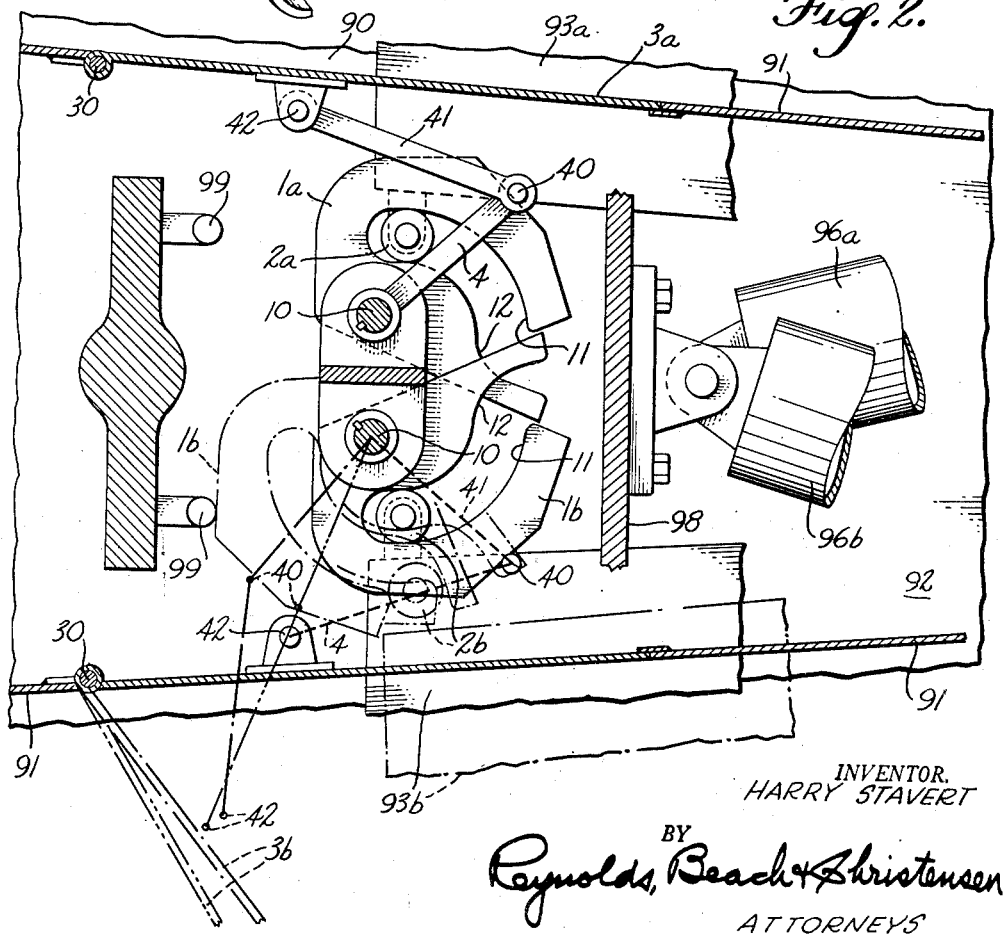
Figure 2 is a general plan view of the locking means, with parts shown in full lines in the retracted, or locked, position, and showing in broken lines of various sorts different positions which the locking means will assume at definite stages in the unlocking operation. The surrounding, supporting and enclosing structure is shown in section.

It is clear that when the hook members are in the full line position of Figure 2, the retainers 2 are held securely in their fully inwardly retracted positions, thereby to lock the flaps 93 in their retracted positions, provided the hook member 1 may not rotate. Its rotation from such retracted position is prevented by means of a vane 3, which is pivoted upon the strut 91 at 30, adjacent the vane's forward vertical edge, so that the vane may swing outwardly into the relative airstream, or inwardly to a retracted position. This vane is operatively connected to swing with the corresponding hook 1. These vanes, when fully retracted as they are in full lines in Figure 2, constitute part of the streamline contour of the strut 91, but are held tightly closed in such position by the force of the relative airstream. They can be swung forwardly and outwardly like a door, and thus into the relative airstream in order to permit releasing rotation of the corresponding hook 1, if a sufficiently strong opening force is applied to them through the hooks, and if the force of the airstream is lessened, as by the lower speed of the airplane during its landing run. Conversely, they may be swung inwardly from their out- swung unlocked position, under the influence of the relative airstream acting upon the vanes, when the hook member is rotated toward its locking position. The relative airstream, with parts in the full line position of Figure 2, serves as a strong force to prevent any unlocking rotation of the hook, and likewise, through the mechanism about to be described, the force of the airstream serves to prevent any locking rotation of the hook, holding it instead in position for reengagement by its inswinging retainer 2.

The interconnection between the vane 3 and the corresponding hook 1 may be any that is found suitable, but that particularly illustrated has been found very effective. It comprises a lever 4 fixed to and rotative with the pivot 10 of the corresponding hook and a link 41 pivotally connected at 40 to the swinging end of the lever 4, and at 42 to the vane 3. In effect, the lever 4 and link 41 constitute an articulated toggle linkage so designed that as the hook nearly reaches its releasing position, shown in dash-two-dot lines in Figure 2, the linkage (shown in similar lines) will be in an in-line position, but the retainer will not yet be fully released. Since the flap on which the retainer is mounted is being opened under control of the power means 96, the terminal portion of the cam slot, being that portion indicated at 11, will be acted upon by the still outwardly swinging retainer 2, and will cause further movement of the hook member in the opening sense, past the in-line position, until parts reach the dot-dash line position, wherein the hook member brings up against a fixed stop 99. Parts are assisted in movement into this final position, and are held there, by the biasing springs 14 which, when parts reach the dot-dash position, have passed an on-center position. The articulated linkage is left thereby in a past-center, dot-dash position, with the vane 3 also in the slightly rearwardly swung dot-dash position to which it is moved by the relative airstream from the dash-two-dot position. In this position of the parts the relative airstream, acting on the vane and through the articulated linkage, serves to hold the hook member 1 in its fully released position, wherein the retainer 2 may exit from its cam slot, and so the vane, thus outwardly swung, remains in this position and the hook member remains in position for reengagement when the retainer 2 is swung inwardly with its flap.

When the actuator 96 causes such inward swinging of the flap, the retainer 2 engages first a steeply inclined portion 12 of the cam slot. Since the inward swinging of the flap and retainer, as well as its outward swinging, is under control and restraint of the power means 96, this engagement of the retainer with the inclined portion 12 of the cam slot will tend to swing the hook member 1 toward locking position, until the articulated linkage swings past the in-line position, after which the relative airstream, in addition to the power means at 96, will serve to urge the vane 3 towards its retracted position. When the vane reaches its retracted position, it will retain the hook member and hence the retainer and flap in fully retracted position, as has already been explained.

The mechanical advantage of the inclination of the cam slot, and the force of the relative airstream on the vane 3 communicated to the hook member through the retainer 2 and the cam slot, counteracts any tendency to tear open the flap 93, and yet when the opening force of the actuator 96 is applied to the hook, the latter readily swings open, under control. The two hooks are almost directly opposed, and so mutually resist forces applied to them, which obviates the need for heavily reinforced supporting structure.

I claim as my invention:

1. In combination with supporting aircraft structure, a jet engine supported therefrom, a jet deflector flap hingedly mounted adjacent its rear end on such structure and swingable outwardly and rearwardly into a projected position transverse to the jet stream and to the relative airstream from a retracted position, a retainer carried by said flap adjacent its forward swinging end, a hook member pivotally mounted on said structure and formed with a cam slot for engagement with said retainer, a vane pivotally mounted, adjacent a vertical edge, on said structure to swing into a position projected into the relative airstream from a retracted position, means operatively connecting said vane and said hook member for conjoint movement such that the exit of the cam slot reaches releasing position, to disengage the flap's retainer, as the vane reaches the limit of its projective movement, the means connecting the vane and hook member including means which are self-locking in such limit position of the vane, and the cam slot of the hook member having an inclined section adjacent its pivot axis whereon the retainer is active upon projective swinging of the flap, to effect projective swinging of the vane and to limit projective swinging of the flap until the vane is substantially fully outswung, and having an inclined section adjacent its exit opening engageable by the retainer near the end of the retractive swinging of the flap to unlock the flap-locking means and to initiate retractive movement of the flap, and power means to urge the flap projectively and to control its projective swinging.

2. In combination with supporting aircraft structure, a jet engine supported therefrom, a jet deflector flap hingedly mounted adjacent its rear end on such structure and swingable outwardly and rearwardly into a projected position transverse to the jet stream and to the relative airstream from a retracted position, a retainer carried by said flap adjacent its forward swinging end, a hook member pivotally mounted on said structure and formed with a cam slot for engagement with said retainer, a vane pivotally mounted, adjacent a vertical edge, on said structure to swing into a position projected into the relative airstream from a retracted position, a pair of articulated links interconnecting the vane and the hook member, one whereof is secured to rotate with the hook, and the other whereof connects the swinging end of the first link with the vane, said links being movable past an in-line position during projective swinging of the vane into a self-locking position at the limit of the vane's projective movement, and the exit of the cam slot being disposed in releasing and reengaging position with respect to the retainer by disposition of the vane in its projective limit position, the cam slot of the hook member having an incline adjacent its pivot axis whereon the retainer is active upon projective movement of the flap, formed to effect projective swinging of the vane to the in-line position of the links during initial projective swinging of the flap, and a further incline adjacent its exit whereon the retainer is active to swing the flap and the links into the self-locking position by further projective swinging of the flap, and the cam slot also having an incline engageable by the retainer during the final retractive swinging of the flap to swing the links from the self-locking position past the in-line position and to swing the vane to its retracted position as the flap reaches its retracted position, and power means to urge the flap projectively and retractively, and to control its swinging in each such sense.

3. The combination of claim 2, including biasing means to assist in moving the links past their in-line position in the projective sense.

4. In combination with aircraft structure and with a deflector flap hingedly mounted at its rear edge upon said structure to swing outwardly and rearwardly from a retracted position into a projected position within the relative airstream, a hook member pivotally mounted upon the aircraft structure adjacent the inswung forward edge of said flap, a retainer carried by said flap at its swinging edge and engageable by said hook member and disengageable therefrom, a vane hingedly mounted at its forward edge upon the aircraft structure to swing from a retracted position into a position projected into the airstream, means operatively interconnecting the hook member to the vane to swing the latter into projected position by pivotal movement of the hook member to its disengaging position, and vice versa, said interconnecting means including a strut movable into self-locking position by swinging of the vane into its final projective position, to retain the hook member into disengaging and reengaging position during further projective swinging of the flap, and the hook member having means engageable by the retainer during final retractive movement of the flap, to move the strut from its self-locking position and to effect swinging of the vane to its retracted position, whereby to lock the flap in its retracted position, and power means operatively connected to the flap to swing it under control projectively and retractively.

5. In combination with aircraft structure and with a deflector flap hingedly mounted at its rear end upon said structure to swing outwardly and rearwardly from a retracted position to an operative position, a hook member pivotally mounted upon the aircraft structure in a position adjacent the swinging edge of said deflector flap when the latter is in its retracted position, flap-retaining means carried by the deflector flap for engagement by said hook member, a vane hingedly mounted at its forward edge upon the aircraft structure to swing from a retracted position out of the airstream, into a projected position to be impinged and urged towards its retracted position by the airstream, means operatively connecting the hook member and the vane for conjoint swinging, whereby movement of the vane into a given projected position accompanies movement of the hook member into releasing position, and conversely movement of the hook member towards flap-retaining position accompanies movement of the vane towards its retracted position, toggle link means interconnecting said aircraft structure and said vane, including a lever swingable with the hook means and a link connecting the swinging end of the lever with the vane, the lever and link being arranged to swing past an in-line position to a self-locking position, and oppositely towards releasing position, and stop means to prevent their further movement upon reaching self-locking position.

6. In combination with aircraft structure and with a jet thrust reverser flap mounted upon such aircraft structure adjacent the nozzle of a jet engine for movement outwardly and rearwardly from a retracted position into the relative airstream and to an operative position wherein it projects into and intercepts the issuing jet, power means operatively connected to said flap to effect its movement to and from such operative position under control notwithstanding the tendency of the relative airstream to pull it open, a vane mounted upon the aircraft structure for movement outwardly and forwardly from a retracted position into the relative airstream to a projected position, wherein the airstream tends to return it to retracted position, a hook member pivotally mounted on the aircraft structure and a complemental retainer member carried by the outwardly movable portion of the flap, for engagement by said hook member when the flap is in its retracted position but upon disengagement permitting continued outward movement of the flap, said hook member being shaped as a cam active on said retainer to effect initial outward movement of the flap by and during initial pivotal movement of the hook towards disengaging position, and upon further movement of the hook member to final disengaging position to complete outward movement of the flap, and being further shaped as a cam whereon said retainer is active during retractive movement of the flap to return the hook to its initial position, and means operatively connecting said hook member and said vane for outward movement of the vane as the hook member pivots towards disengaging position, locking means operatively connected to said vane, and arranged for operation by movement of the hook member with the vane into and from final disengaging position, to retain the vane in its outward position or to release it for retractive movement, respectively, and stop means to retain the hook member in its final disengaging position until released therefrom by reverse pivotal movement of the hook member and the latter's engagement by the retainer member, as the flap moves towards its retracted position.

7. In combination with supporting and streamlined aircraft structure, a jet engine supported therefrom and having a tailpipe discharging rearwardly, a jet thrust reversing device movable from a retracted position to a reversing position wherein it is located behind the tailpipe, and arranged to intercept, contain, and direct issuing gases forwardly, a vane hingedly mounted along its forward edge upon the aircraft structure for movement between a projected position wherein its rear edge is swung outwardly into the airstream and a retracted position wherein the vane substantially coincides with the streamline contour of the structure, complemental locking elements carried by and movable with the vane and the jet thrust reversing device, respectively, arranged for locking interengagement when the thrust reversing device and the vane are retracted, and for disengagement by movement of the vane into such projected position.

8. In combination with a jet engine the tailpipe whereof discharges rearwardly, and supporting structure constituting, with the engine, a streamlined propulsive assembly, a jet thrust reversing device mounted upon said streamlined propulsive assembly for movement from a retracted position to a reversing position wherein it is located behind the tailpipe, and arranged to intercept, contain, and deflect issuing gases forwardly, a vane mounted upon said streamlined propulsive assembly for movement between a projected position wherein it is directed outwardly into the airstream and a retracted position wherein it is within the streamline contour of the assembly, complemental locking elements carried by and movable with the vane and the jet thrust reversing device, respectively, arranged for locking interengagement when the thrust reversing device and the vane are retracted, and for disengagement by movement of the vane into such projected position.

References Cited in the file of this patent

UNITED STATES PATENTS

| | | |
|---|---|---|
| 2,620,622 | Lundberg | Dec. 9, 1952 |
| 2,681,548 | Kappus | June 22, 1954 |